United States Patent
Yoshimura et al.

(10) Patent No.: US 9,185,320 B2
(45) Date of Patent: Nov. 10, 2015

(54) SOLID-STATE IMAGING DEVICE, METHOD FOR DRIVING SOLID-STATE IMAGING DEVICE, AND ELECTRONIC DEVICE

(71) Applicant: Sony Corporation, Tokyo (JP)

(72) Inventors: Ryuugi Yoshimura, Nagasaki (JP); Hiroyasu Kondou, Fukuoka (JP)

(73) Assignee: Sony Corporation, Tokyo (JP)

( * ) Notice: Subject to any disclaimer, the term of this patent is extended or adjusted under 35 U.S.C. 154(b) by 109 days.

(21) Appl. No.: 13/896,548

(22) Filed: May 17, 2013

(65) Prior Publication Data

US 2013/0329104 A1 Dec. 12, 2013

(30) Foreign Application Priority Data

Jun. 12, 2012 (JP) ................................. 2012-132682

(51) Int. Cl.
  *H04N 5/378* (2011.01)
  *H04N 5/347* (2011.01)
(52) U.S. Cl.
  CPC ............... *H04N 5/378* (2013.01); *H04N 5/347* (2013.01)
(58) Field of Classification Search
  CPC ....... H04N 5/374; H04N 5/378; H04N 5/375; H04N 5/3745; H04N 5/3765

USPC ........ 348/251, 280, 241, 222.1, 229.1, 225.1, 348/272, 294, 308, 302–305
See application file for complete search history.

(56) References Cited

U.S. PATENT DOCUMENTS

| | | | | |
|---|---|---|---|---|
| 7,777,798 | B2 * | 8/2010 | Mabuchi | 348/308 |
| 8,441,566 | B2 * | 5/2013 | Ota | 348/308 |
| 8,610,809 | B2 * | 12/2013 | Ebihara | 348/294 |
| 2009/0072120 | A1 * | 3/2009 | McGarry et al. | 250/208.1 |
| 2011/0102623 | A1 * | 5/2011 | Ebihara | 348/222.1 |
| 2011/0122306 | A1 * | 5/2011 | Ota | 348/302 |

FOREIGN PATENT DOCUMENTS

JP 2011-097539 A 5/2011

* cited by examiner

*Primary Examiner* — Ahmed A Berhan
(74) *Attorney, Agent, or Firm* — Sony Corporation

(57) ABSTRACT

A solid-state imaging device includes a pixel array unit composed of pixels including photoelectric conversion elements which are arranged in a matrix, and a pixel drive unit configured to perform a row selection operation of simultaneously selecting plural rows when a row is selected in accordance with an address signal for the respective pixels in the pixel array unit in a read period where signals are read out from the pixels.

9 Claims, 6 Drawing Sheets

SOLID-STATE IMAGING DEVICE, METHOD FOR DRIVING SOLID-STATE IMAGING DEVICE, AND ELECTRONIC DEVICE

BACKGROUND

The present disclosure relates to a solid-state imaging device, a method for driving a solid-state imaging device, and an electronic device.

Solid-state imaging devices include a CMOS image sensor that can read out signals of pixels in plural rows simultaneously and in parallel (for example, see Japanese Unexamined Patent Application Publication No. 2011-97539). Operations such as an add and read operation of adding signals of pixels in plural rows and reading out the adding result and a high-speed read operation of reading out signals at a higher speed to improve a frame rate as compared with a case in which signals of pixels are read out for every row can be realized by reading out the signals of the pixels in the plural rows simultaneously and in parallel.

SUMMARY

In the solid-state imaging device in the related art, a row selection circuit having a function of latching an address signal from a sensor controller for every row is mounted to simultaneously select plural rows. A latch set operation of latching address signals on plural arbitrary rows in the row selection circuit is to be carried out in this solid-state imaging device.

However, the solid-state imaging device in the related art adopts a configuration of performing the latch set operation before reading of a reset level from the pixel or reading of a signal level is started. Accordingly, particularly in a case where the improvement in the frame rate is aimed through the high-speed reading by simultaneously reading out signals of plural pixels, a period spent for the latch set operation causes an adverse effect (disturbance) for the high speed reading.

As countermeasures thereof, when dividing the addresses into N systems and setting address latch on the selected rows in parallel, the period spent for the latch set operation can be shortened to 1/N. However, in this case, address decoders for the N systems are to be mounted, and an adverse effect exists that a circuit scale increases.

According to the present disclosure, it is desirable to provide a solid-state imaging device that can realize the read operation at a higher speed without an increase in the circuit scale when signals of pixels in plural rows are simultaneously read out, a method for driving a solid-state imaging device, and an electronic device including the solid-state imaging device.

A solid-state imaging device according to an embodiment of the present disclosure includes: a pixel array unit composed of pixels including photoelectric conversion elements which are arranged in a matrix; and a pixel drive unit configured to perform a row selection operation of simultaneously selecting plural rows when a row is selected in accordance with an address signal for the pixels in the pixel array unit in a read period where signals are read out from the pixels.

A method for driving a solid-state imaging device according to an embodiment of the present disclosure includes: when driving the solid-state imaging device in accordance with an address signal for pixels in a pixel array unit composed of the pixels including photoelectric conversion elements and being arranged in a matrix, conducting a row selection operation of simultaneously selecting plural rows in a read period where signals are read out from the pixels.

Since the row selection operation of simultaneously selecting plural rows is conducted in the read period where signals are read out from pixels, as compared with the case in which the row selection operation is conducted before reading of the reset level from a pixel or reading of the signal level is started, the period to be spent for the row selection operation is not particularly prepared. Thus, the read operation can be realized at a higher speed by only changing the drive timing without any change in the circuit.

According to the embodiments of the present disclosure, when signals of pixels in plural rows are simultaneously read out, the read operation can be realized at a higher speed without an increase in the circuit scale, and it is possible to realize the improvement in the frame rate.

DETAILED DESCRIPTION OF EMBODIMENTS

Figure 1:
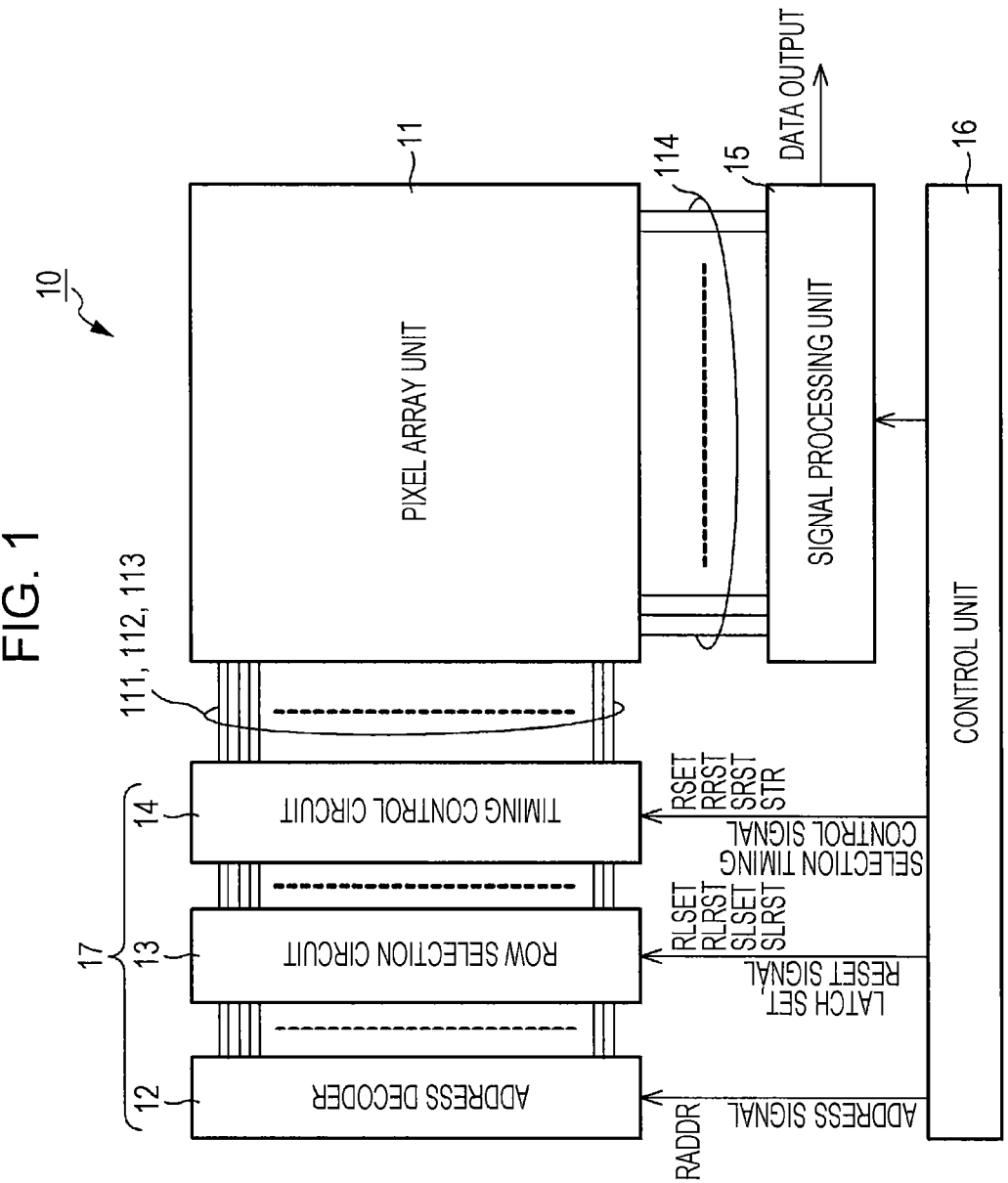
FIG. 1 is a system configuration diagram illustrating a configuration example of a solid-state imaging device according to an embodiment of the present disclosure.

Hereinafter, a mode for carrying out a technology of the present disclosure (which will be referred to as an embodiment below) will be described in detail by using the drawings. The present disclosure is not limited to the embodiment. In the following description, same reference symbols are used for same elements or elements having same functions, and a duplicated description thereof will be omitted. The description will be given in the following order.

1. Overall description on a solid-state imaging device, a method for driving a solid-state imaging device, and an electronic device of the present disclosure
2. Solid-state imaging device according to an embodiment
   2-1. System configuration
   2-2. Pixel circuit
   2-3. Characteristic part of the embodiment
3. Other application examples
4. Electronic device
5. Configuration of the present disclosure

1. Overall Description on a Solid-State Imaging Device, a Method for Driving a Solid-State Imaging Device, and an Electronic Device of the Present Disclosure A solid-state imaging device of the present disclosure is an X-Y address-type solid-state imaging device that can freely set an order in which signals of respective pixels in a pixel array unit are read, such as a CMOS image sensor or a MOS image sensor.

The solid-state imaging device of the present disclosure includes a pixel array unit composed of pixels including photoelectric conversion elements which are arranged in a matrix and a pixel drive unit configured to perform a row selection operation of simultaneously selecting plural rows when a row is selected in accordance with an address signal for the respective pixels in the pixel array unit in a read period where signals are read out from the pixels.

The method for driving a solid-state imaging device according to the present disclosure performs a row selection operation in accordance with an address signal on respective pixels in a pixel array unit composed of pixels including photoelectric conversion elements which are arranged in a matrix, includes performing the row selection operation of simultaneously selecting plural rows in a read period where signals are read out from the pixels.

The pixel drive unit configured to perform the row selection in accordance with the address signal corresponds to a row scanning unit (vertical scanning unit) of an address latch system of temporarily latching the address signal. It is possible to read out signals of pixels in plural rows simultaneously and in parallel through the row selection operation of simultaneously selecting the plural rows. Through this read operation, it is possible to realize operations such as, for example, an add and read operation of adding signals of pixels in plural rows and reading out the adding result and a high-speed read operation of reading out signals at a higher speed to improve a frame rate as compared with a case in which signals of pixels are read out for every row.

Since the row selection operation of simultaneously selecting plural rows is conducted in the read period where signals are read out from pixels, as compared with the case in which the row selection operation is conducted before reading of the reset level from a pixel or reading of the signal level is started, a period spent for the row selection operation is not particularly prepared. Accordingly, the read operation can be realized at a higher speed only by changing the drive timing without any change in the circuit. Therefore, when signals of pixels in plural rows are simultaneously read out, the read operation can be realized at a higher speed without an increase in the circuit scale, and the improvement in the frame rate can be realized.

It is thus possible to realize the solid-state imaging device having a high frame rate with which the read operation can be realized at a higher speed without an increase in the circuit scale. The thus configured solid-state imaging device, that is, the solid-state imaging device of the present disclosure can be used as an imaging unit (image capturing unit) in an electronic device such as a mobile terminal device provided with an imaging function such as a mobile phone device, a digital still camera, a single-lens reflex camera, a camcorder, or a security camera.

In the solid-state imaging device of the present disclosure, a signal processing circuit such as, for example, a digital signal processor (DSP) circuit configured to process an imaging signal may be arranged in the same semiconductor substrate (chip) where the pixel array unit is arranged or may be arranged outside of the chip.

The solid-state imaging device of the present disclosure may adopt a so-called horizontal structure or layered structure. The horizontal structure herein refers to a structure in which peripheral circuits of the pixel array unit, that is, a drive unit configured to drive the respective pixels in the pixel array unit, a signal processing unit configured to apply predetermined signal processing on signals read out from the pixels, and the like are arranged on the same chip where the pixel array unit is arranged. The layered structure herein refers to a structure in which the pixel array unit and the peripheral circuits are mounted on different chips, and these chips are layered on each other.

In the solid-state imaging device, the method for driving the solid-state imaging device, and the electronic device including the above-mentioned configuration of the present disclosure, the pixel drive unit can perform the row selection operation of simultaneously selecting plural rows in a settling period of an analog circuit configured to process signals read out from pixels.

In the solid-state imaging device, the method for driving the solid-state imaging device, and the electronic device including the above-mentioned configuration of the present disclosure, the pixel drive unit can perform in a current read period both the row selection operation on read rows where signals of pixels are read in the current read period and the row selection operation on reset rows where a reset of the pixels is conducted in a next read period.

In the solid-state imaging device, the method for driving the solid-state imaging device, and the electronic device including the above-mentioned configuration of the present disclosure, an AD converter configured to sequentially digitize analog reset levels and signal levels read out from pixels may further be provided. In this case, the pixel drive unit can perform the row selection operation on reset rows where the reset of pixels is conducted in the next read period, in the settling period of the analog circuit configured to process the signals read out from the pixels and an AD conversion period with regard to the signal levels.

When the row selection operation on the reset rows where the reset of the pixels is conducted in the next read period is conducted in the AD conversion period with regard to the signal levels, the row selection operation is preferably conducted in a latter part of the AD conversion period. The AD conversion on a white level side of the signal levels is conducted in the latter part of the AD conversion period with regard to the signal levels.

In the solid-state imaging device, the method for driving the solid-state imaging device, and the electronic device including the above-mentioned configuration of the present disclosure, a control unit configured to control the pixel drive unit may further be provided, and the control unit can supply an address signal to the pixel drive unit. In this case, the control unit can perform an operation of setting the address signal to the pixel drive unit plural times dividedly in the read period where the signals are read out from the pixels.

2. Solid-state Imaging Device According to an Embodiment

FIG. 1 is a system configuration diagram illustrating a configuration example of a solid-state imaging device according to an embodiment of the present disclosure. Herein, a CMOS image sensor will be described as the solid-state imaging device according to the present embodiment, for example. It is noted that the technology of the present disclosure can be applied to not only the CMOS image sensor but also other solid-state imaging devices of an X-Y address type that can freely set an order in which signals of respective pixels in the pixel array unit are read out, such as a MOS image sensor.

2-1. System Configuration

As illustrated in FIG. 1, a solid-state imaging device 10 according to the present embodiment includes a pixel array unit 11, an address decoder 12, a row selection circuit 13, a timing control circuit 14, a signal processing unit 15, and a control unit 16.

The pixel array unit 11 is composed of pixels 20 including photoelectric conversion elements (see FIG. 2) which are arranged in a matrix. The address decoder 12, the row selection circuit 13, and the timing control circuit 14 constitute a pixel drive unit 17 configured to perform a row selection operation with respect to the pixels 20 in the pixel array unit 11 in accordance with an address signal RADDR supplied from the control unit 16. The pixel drive unit 17 functions as a row scanning unit (vertical scanning unit) of an address latch system which temporarily latches the address signal.

In the pixel drive unit 17, the address decoder 12 decodes the address signal RADDR supplied from the control unit 16 to an address decode signal ADDR for selecting a particular row. The row selection circuit 13 latches row addresses of both a read row and a shutter row in accordance with latch set signals RLSET and SLSET and latch reset signals RLRST and SLRST supplied from the control unit 16 and the address decode signal ADDR supplied from the address decoder 12. Herein, the read row refers to a pixel row where reading of a signal is conducted, and the shutter row refers to a pixel row where charge accumulated in the photoelectric conversion element is discharged to reset the pixels.

The timing control circuit 14 appropriately outputs drive signals to plural pixel drive lines 111, 112, and 113 (see FIG. 2) arranged for each pixel row of the pixel array unit 11 in accordance with selection timing control signals RSET, RRST, SRST, RTR, and STR, and the like supplied from the control unit 16 and the row addresses supplied from the row selection circuit 13. Details of the plural pixel drive lines 111, 112, and 113 and the drive signals will be described below.

The signal processing unit 15 performs predetermined signal processing on the signals output from the respective pixels 20 in the pixel array unit 11 through signal lines 114 under the control by the control unit 16. Examples of the predetermined signal processing include, for example, processing of simply sampling and holding the signals output through the signal lines 114, correlated double sampling (CDS) processing of removing fixed pattern noise specific to the pixels, analog-to-digital (AD) conversion processing and the like. Each signal processing described above is merely an example, and the embodiment is not limited to the processing.

In the signal processing unit 15, noise removal processing is conducted to remove the fixed pattern noise specific to the pixels such as reset noise or a threshold variation of an amplification transistor 24 (see FIG. 2) by calculating a difference between reset levels and signal levels sequentially read out from the pixels 20 in the CDS processing as described below.

An AD converter configured to perform the AD conversion processing may be, for example, an AD converter having a configuration of generating a pulse signal having a size (pulse width) in a time axis direction corresponding to a size of the pixel signal level and counting a predetermined clock by a counter during a period corresponding to the pulse width of the pulse signal. In the AD converter having the above-mentioned configuration, a count value of the counter is a digital value of the pixel signal.

The control unit 16 supplies the address signal RADDR to the address decoder 12, supplies the latch set signals RLSET and SLSET and the latch reset signals RLRST and SLRST to the row selection circuit 13, and supplies the selection timing control signals RSET, RRST, SRST, RTR, and STR to the timing control circuit 14. The control unit 16 further controls the signal processing unit 15 so as to execute each signal processing described above in the signal processing unit 15.

2-2. Pixel Circuit

Figure 2:
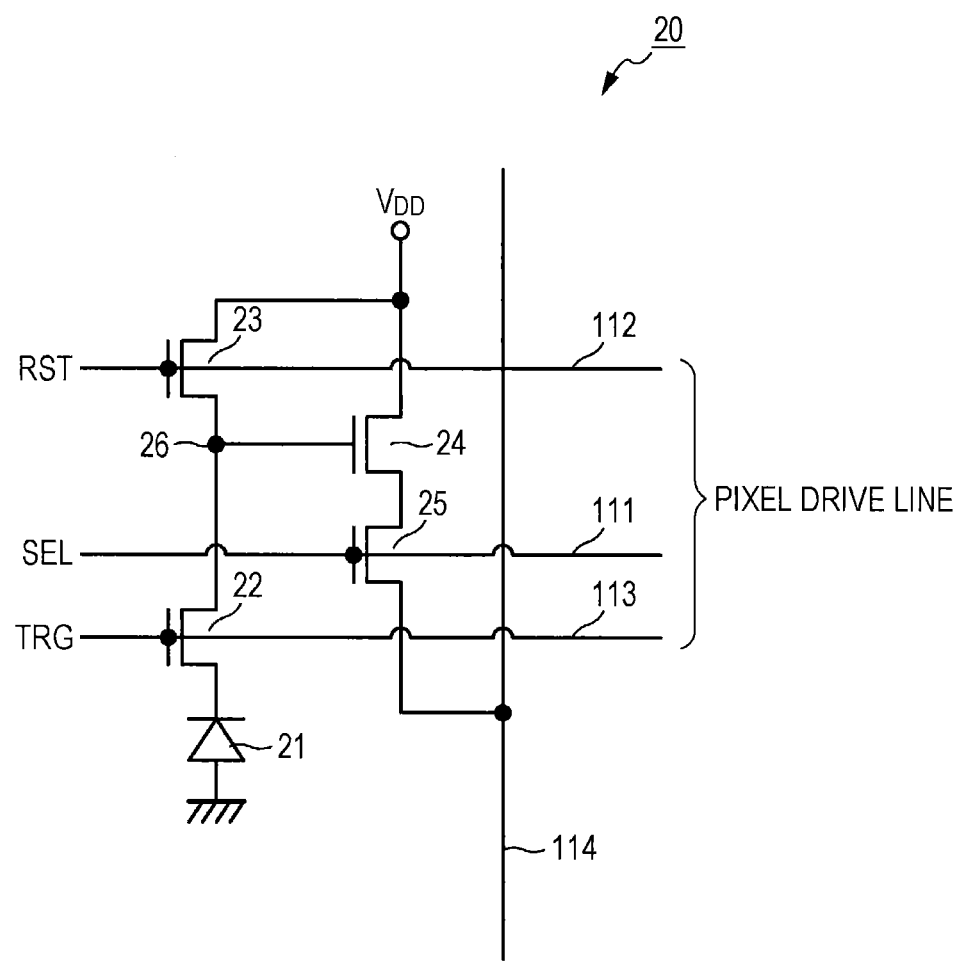
FIG. 2 is a circuit diagram of a circuit configuration example of a pixel.

FIG. 2 is a circuit diagram illustrating a circuit configuration example of the pixel 20. As illustrated in FIG. 2, the pixel 20 according to the circuit example includes a photodiode 21, for example, as the photoelectric conversion element. The pixel 20 includes four transistors including, for example, a transfer transistor (transfer gate) 22, a reset transistor 23, the amplification transistor 24, and a selection transistor 25 in addition to the photodiode 21.

Herein, for example, an N-channel transistor is used for the four transistors 22 to 25. Combinations of conductive types of the transfer transistor 22, the reset transistor 23, the amplification transistor 24, and the selection transistor 25 represented herein are merely examples, and the embodiment is not limited to these combinations. That is, combinations using a P-channel transistor may be adopted as appropriate.

With regard to the pixels 20, three drive wires including, for example, a selection line 111, a reset line 112, and a transfer line 113 are shared as pixel drive lines by pixels in a same pixel row. One end of each of the selection line 111, the reset line 112, and the transfer line 113 is connected for each pixel row to an output terminal corresponding to the pixel row in the pixel drive unit 17 which is the row scanning unit. A selection signal SEL, a reset signal RST, and a transfer signal TRG corresponding to drive signals for driving the pixels 20 are transmitted through the respective lines.

An anode of the photodiode 21 is connected to a negative-side power supply (for example, ground). The photodiode 21 photoelectrically converts received light (incident light) into photocharge (herein, photoelectron) having the charge amount corresponding to the light amount, and accumulates the photocharge. A cathode of the photodiode 21 is electrically connected to a gate electrode of the amplification transistor 24 via the transfer transistor 22. A node 26 electrically connected to the gate electrode of the amplification transistor 24 is referred to as a floating diffusion (FD) part.

The transfer transistor 22 is connected between the cathode of the photodiode 21 and the FD part 26. A gate electrode of the transfer transistor 22 is supplied with the transfer signal TRG via the transfer line 113 in which a high level (for example, $V_{DD}$ level) is active (hereinafter, which will be described as High active). In response to the transfer signal TRG, the transfer transistor 22 is set in the conductive state and transfers the photocharge photoelectrically converted by the photodiode 21 to the FD part 26.

A drain electrode of the reset transistor 23 is connected to a pixel power supply $V_{DD}$, and a source electrode of the reset transistor 23 is connected to the FD part 26. A gate electrode of the reset transistor 23 is supplied with the reset signal RST at High active via the reset line 112. In response to the reset signal RST, the reset transistor 23 is set in the conductive state and the charge of the FD part 26 is discharged into the pixel power supply $V_{DD}$ to thereby reset the FD part 26.

A gate electrode of the amplification transistor 24 is connected to the FD part 26, and a drain electrode of the amplification transistor 24 is connected to the pixel power supply $V_{DD}$. The amplification transistor 24 outputs a potential at the FD part 26 after the reset by the reset transistor 23 as a reset signal (reset level) $V_{reset}$. The amplification transistor 24 further outputs a potential at the FD part 26 after the transfer of the signal charge by the transfer transistor 22 as a light accumulation signal (signal level) $V_{sig}$.

A drain electrode of the selection transistor 25 is connected, for example, to a source electrode of the amplification transistor 24, and a source electrode of the selection transistor 25 is connected to the signal line 114. A gate electrode of the selection transistor 25 is supplied with the selection signal SEL at High active via the selection line 111. In response to the selection signal SEL, the selection transistor 25 is set in the conductive state, and a signal output from the amplification transistor 24 while the pixel 20 is set in a selected state is read out to the signal line 114.

As may be apparent from the above description, the potential at the FD part 26 after the reset is read out as the reset level $V_{reset}$ and subsequently the potential at the FD part 26 after the transfer of the signal charge is read out as the signal level $V_{sig}$ from the pixel 20 to the signal line 114 in sequence. It is noted that the signal level $V_{sig}$ also includes a component of the reset level $V_{reset}$.

The circuit configuration is herein adopted in which the selection transistor 25 is connected between the source electrode of the amplification transistor 24 and the signal line 114, but the selection transistor 25 may be connected between the pixel power supply $V_{DD}$ and the drain electrode of the amplification transistor 24.

A configuration of the pixel 20 is not limited to the configuration including four transistors described above. For example, the pixel 20 may have a configuration including three transistors where one transistor is used for both the amplification transistor 24 and the selection transistor 25, a configuration in which transistors subsequent to the FD part 26 are shared among plural photoelectric conversion elements (among pixels), or the like, and any configuration for the pixel circuit may appropriately be used.

2-3. Characteristic Part of the Embodiment

In the solid-state imaging device 10 to which the pixel drive unit 17 of the address latch system described above is mounted, the row selection operation of simultaneously selecting plural rows is conducted in a read period where signals are read out from the respective pixels 20 in the pixel array unit 11 when the rows are selected in accordance with the address signal RADDR supplied from the control unit 16. The signals read out from the pixels 20 herein refer to the reset level $V_{reset}$ and the signal level $V_{sig}$.

The row selection operation of simultaneously selecting plural rows can be used, for example, in operation modes such as an add and read operation of adding signals of pixels in plural rows and reading out the adding result and a high-speed read operation of reading out signals at a higher speed to improve a frame rate as compared with a case in which signals of pixels are read out for every row. The operation modes are not limited to the above.

In these operation modes, for example, an operation mode such as a thinning-out read operation of intermittently reading out signals of pixels while arbitrarily skipping pixel rows and pixel columns can also be used in combination. In the thinning-out read operation, if the charge accumulated in the pixel where the signal remains is not appropriately discharged, a so-called blooming phenomenon in which the charge overflows to be mixed into an adjacent pixel may occur. As countermeasures to the blooming phenomenon, a shutter operation of appropriately discharging the charge accumulated in the pixel where the signal is not read out, that is, a so-called anti-blooming shutter operation may be performed in combination in some cases.

A drive timing for conducting the row selection operation of simultaneously selecting plural rows in the read period where the signals are read out from the pixels is set under the control by the control unit 16 on the pixel drive unit 17. In other words, the control unit 16 controls the pixel drive unit 17 so that the row selection operation of simultaneously selecting plural rows is conducted plural times dividedly in the read period where the signals are read out from the pixels.

As described above, since the row selection operation of simultaneously selecting plural rows is conducted in the read period where the signals are read out from the pixels, the period spent for the row selection operation is not particularly prepared as compared with the case in which the row selection operation is conducted before reading of the reset level $V_{reset}$ from the pixel or reading of the signal level $V_{sig}$ is started. Accordingly, the read operation can be realized at a higher speed by only changing the drive timing of the control unit 16 without any change in the circuit. Therefore, when signals of pixels in plural rows are simultaneously read out, the read operation can be realized at a higher speed without an increase in the circuit scale, and the improvement in the frame rate can be realized.

Hereinafter, specific examples of the solid-state imaging device according to the present embodiment will be described, in which the row selection operation of simultaneously selecting plural rows is performed in the read period where signals are read out from the respective pixels 20 in the pixel array unit 11.

First Example

Figure 3:
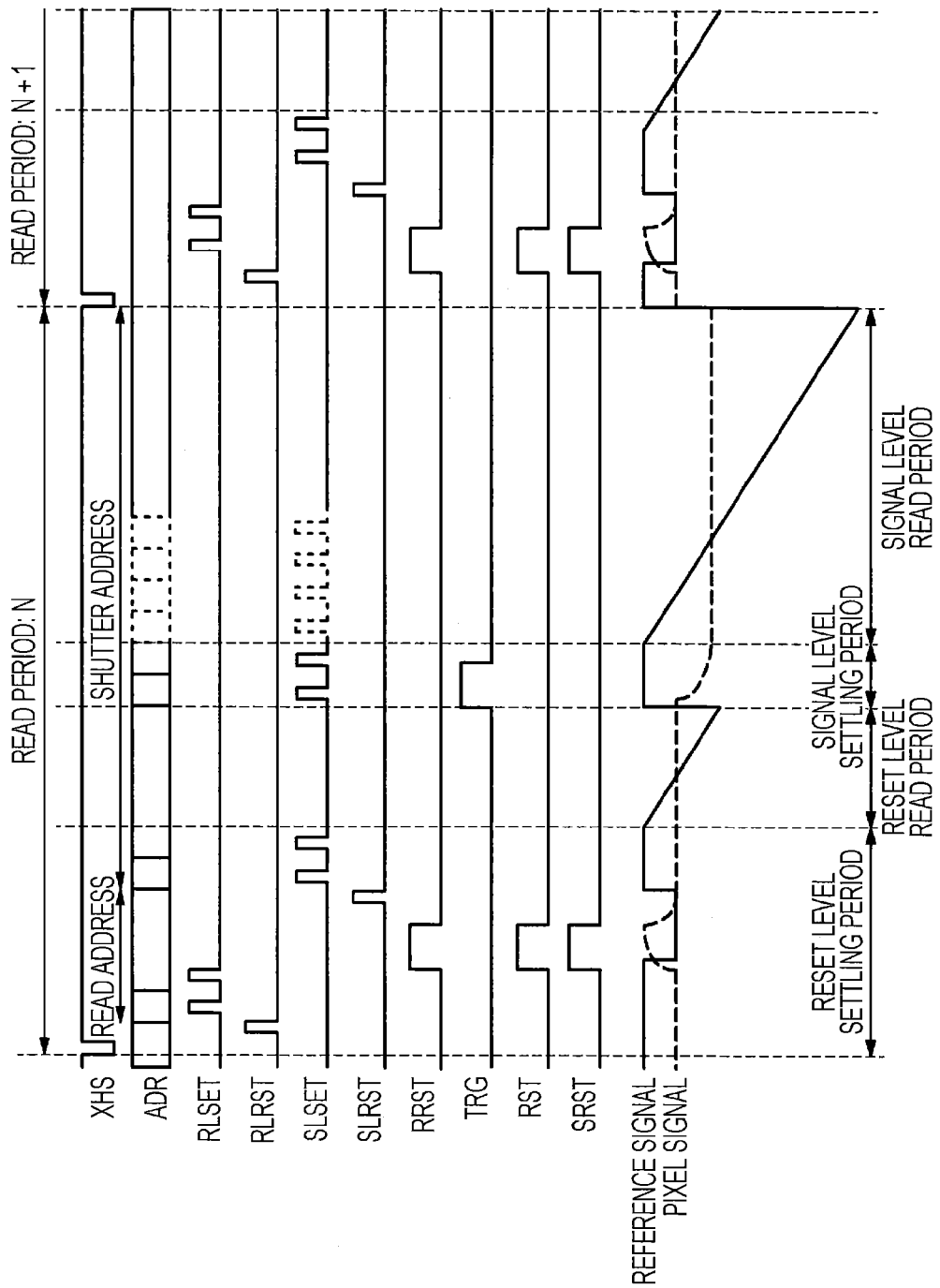
FIG. 3 is a timing chart for describing an operation by a solid-state imaging device according to a first example.

FIG. 3 is an operation timing chart for a solid-state imaging device according to a first example. A case is exemplified in which two rows (two lines) are simultaneously selected in the row selection operation of simultaneously selecting plural rows.

In FIG. 3, a period between a horizontal synchronization signal XHS and the next horizontal synchronization signal XHS corresponds to a read period where signals, that is, the reset level $V_{reset}$ and the signal level $V_{sig}$ are read out from the pixels 20. A row address ADR corresponds to the address of the read row where the reading of the signal is conducted and the address of the shutter row where the charge accumulated in the photoelectric conversion element is discharged to reset the pixel.

The latch set signal RLSET for the read row and the latch reset signal RLRST for the read row are supplied from the control unit 16 to the row selection circuit 13. When the latch reset signal RLRST is supplied, the row selection circuit 13 resets the latch content of the read row. When the latch set signal RLSET is supplied, the row selection circuit 13 latches the row address ADR of the read row in accordance with the address decode signal ADDR supplied from the address decoder 12.

The latch set signal SLSET for the shutter row and the latch reset signal SLRST for the shutter row are supplied from the control unit 16 to the row selection circuit 13. When the latch reset signal SLRST is supplied, the row selection circuit 13 resets the latch content of the shutter row. When the latch set signal SLSET is supplied, the row selection circuit 13 latches the row address ADR of the shutter row in accordance with the address decode signal ADDR supplied from the address decoder 12.

The reset signal RRST for the read row and the reset signal SRST for the shutter row are supplied from the control unit 16 to the timing control circuit 14. The transfer signal TRG for driving the transfer transistor 22 in FIG. 2 and the reset signal RST for driving the reset transistor 23 in FIG. 2 are supplied from the timing control circuit 14 to the pixel array unit 11 together with the selection signal SEL for driving the selection transistor 25 in FIG. 2.

A reference signal is used in a case where the signal processing unit 15 includes the above-mentioned AD converter. The AD converter generates the pulse signal having the size (pulse width) in the time axis direction corresponding to the size of the pixel signal level and counts the predetermined clock by a counter during the period corresponding to the pulse width of the pulse signal to set the count value as the digital value as described above.

Figure 4:
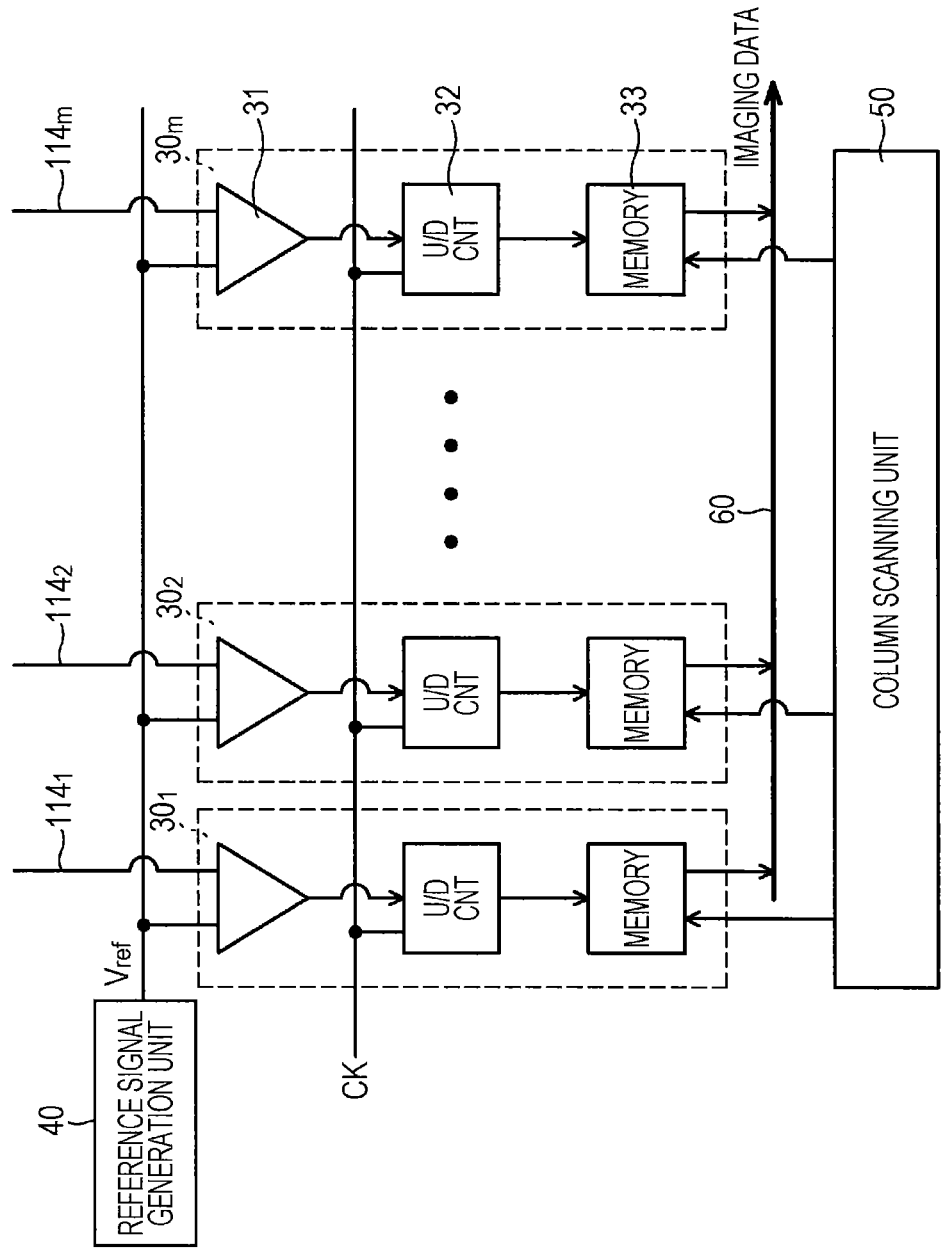
FIG. 4 is a block diagram of a configuration example of an AD converter.

A configuration example of the AD converter will be specifically described herein by using FIG. 4. An AD converter 30 is provided for each column of pixels in the pixel array unit 11, for example. That is, in a case where the number of pixels in the horizontal direction of the pixel array unit 11 (arrangement direction of the pixel columns) is m, the AD converter 30 is a so-called column AD converter composed of the m AD converters $30_1$ to $30_m$ arranged.

In this column AD converter, a reference signal $V_{ref}$ having a so-called ramp waveform (slanted waveform) is used in which a voltage value changes stepwise as the time elapses. The reference signal $V_{ref}$ is the reference signal in FIG. 3. The reference signal $V_{ref}$ having the RAMP waveform is generated by a reference signal generation unit 40. The reference signal generation unit 40 can be composed by using, for example, a digital-to-analog conversion (DAC) circuit.

The AD converters $30_1$ to $30_m$ are each composed, for example, of a comparator 31, a counter 32, a memory 33, and the like. In the AD converter 30 according to the present example, an up/down counter (which is represented as U/DCNT in FIG. 4) is used for the counter 32.

The comparator 31 sets the pixel signals (signal level $V_{sig}$ and reset level $V_{reset}$) read out from the respective pixels 20 in the pixel array unit 11 through the signal lines 114 ($114_1$ to $114_m$) as comparison inputs and sets the reference signal $V_{ref}$ of the ramp waveform supplied from the reference signal generation unit 40 as a reference input to compare those signals to each other.

An output of the comparator 31 is in a first state (for example, high level) when, for example, the reference signal $V_{ref}$ is larger than the pixel signal, and the output of the comparator 31 is in a second state (for example, low level) when the reference signal $V_{ref}$ is smaller than or equal to the pixel signal. This output signal of the comparator 31 is the pulse signal having the pulse width corresponding to the size of the level of the pixel signal.

The up/down counter 32 is supplied with a clock CK at a same timing as a start timing of supplying the reference signal $V_{ref}$ to the comparator 31. The up/down counter 32 performs a down count or an up count in synchronization with the clock CK to measure a period of the pulse width of the output pulse of the comparator 31, that is, a comparison period from the start of the comparison operation until the end of the comparison operation.

This count result (count value) of the up/down counter 32 is a digital value obtained through digitization of the analog pixel signal and is stored in the memory 33. The digital signals processed through the AD conversion in the respective AD converters $30_1$ to $30_m$ are sequentially read out to an output line 60 under a control by a column scanning unit 50 and output as imaging data through the output line 60.

In the AD converters 30 ($30_1$ to $30_m$) according to the present example, the following merit is attained by using the up/down counter for the counter 32. That is, with regard to the reset level V reset and the signal level $V_{sig}$ sequentially read out from the pixels 20, a down count is conducted for the reset level $V_{reset}$, and an up count is conducted for the signal level $V_{sig}$, so that it is possible to obtain a difference between the reset level $V_{reset}$ and the signal level $V_{sig}$. As a result, the CDS processing described above can be conducted in addition to the AD conversion processing.

The description will be further given of the timing chart in FIG. 3. In the solid-state imaging device according to the first example, when the row selection operation (latch operation) of simultaneously selecting two rows is conducted in a read period N, the row selection operation is conducted in a settling period of an analog circuit configured to process signals from the pixels 20. Specifically, as illustrated in FIG. 3, in the settling period of the reset level $V_{reset}$, row addresses of two read rows are latched in synchronization with the latch set signal RLSET for two rows, and row addresses of two shutter rows are latched in synchronization with the latch set signal SLSET for two rows.

The anti-blooming shutter operation, for example, may be conducted as described above in some cases in addition to the shutter operation, corresponding to the two read rows, conducted on the two shutter rows. This anti-blooming shutter operation is conducted in the settling period of the reset level $V_{reset}$. In view of the above, with regard to the row addresses of the shutter rows where the anti-blooming shutter operation is conducted, the row selection operation is conducted in the preceding read period. Specifically, in a case where the read period N is set as a current read period and a read period N+1 is set as a next read period, the row selection operation on the reset row in the next read period N+1 is conducted in the settling period of the signal level $V_{sig}$ in the current read period N.

If the number of pixels simultaneously accessed through the anti-blooming shutter or the like in a single read period is high, that is, if the number of shutter rows where the anti-blooming shutter operation is conducted is high, the row selection operation (latch operation) might not be complete in the settling period of the signal level $V_{sig}$. In this case, the row selection operation is conducted in the read period of the signal level $V_{sig}$, in the present example, an AD conversion period, as illustrated by a dotted line in FIG. 3 in addition to the settling period of the signal level $V_{sig}$.

As described above, according to the first example, the row selection operation on the read row for the read of the signal level $V_{sig}$ in the read period N and the row selection operation on the shutter row for the reset of the pixel in the read period N+1 are conducted in the read period N. Accordingly, the row selection operation and the signal read operation (in the present example, the AD conversion operation) can be conducted in parallel. Since the period for the row selection operation is not particularly (separately) prepared, it is possible to realize a high speed read.

In particular, since the settling period of the reset level $V_{reset}$ and the settling period of the signal level $V_{sig}$ in the read period N are periods where no signal sampling is conducted, those settling periods do not cause effects on degradation in the image quality. Therefore, by conducting the row selection operation (latch operation) in the settling period of the reset level $V_{reset}$ and the settling period of the signal level $V_{sig}$, it is possible to realize the high speed read without the degradation in the image quality.

As described above, for example, when the number of rows simultaneously selected is increased or the number of shutter rows where the anti-blooming shutter operation is conducted is increased, the row selection operation might not be complete in the settling period of the signal level $V_{sig}$. In this case, if the latch operation (the row selection operation) is conducted in the read period of the reset level $V_{reset}$ or the read period of the signal level $V_{sig}$, the level fluctuation of the power supply voltage or the fluctuation of the latch control signals due to the latch operation causes a fluctuation in potentials at the pixel drive lines 111, 112, and 113 (see FIG. 1 and FIG. 2) via parasitic capacitances.

Since the potential fluctuations of the pixel drive lines 111, 112, and 113 lead to the level fluctuation of the pixel signals, the fluctuation for each selected row causes fixed pattern noise, and a problem of the image quality degradation occurs. A solid-state imaging device according to a second example described below is made to solve the above-mentioned problem.

Second Example

Figure 5:
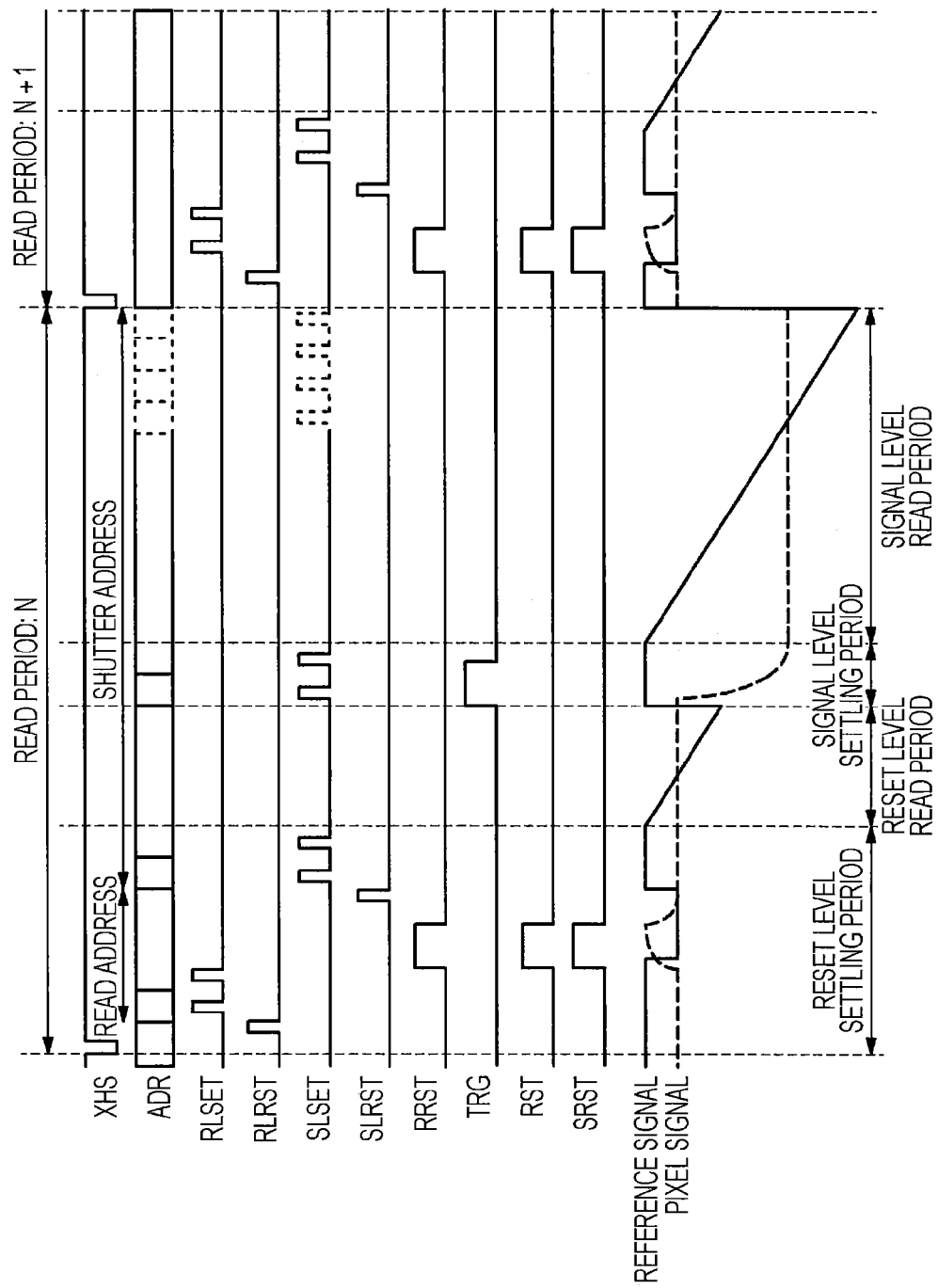
FIG. 5 is a timing chart for describing an operation by a solid-state imaging device according to a second example.

FIG. 5 is an operation timing chart for the solid-state imaging device according to the second example. Similarly to the first example, the row selection operation of simultaneously selecting plural rows will be exemplified in the case where two rows are simultaneously selected.

In the solid-state imaging device according to the second example, the row selection operation of simultaneously selecting two rows is also conducted in the read period of the signal level $V_{sig}$, that is, in a latter part of the AD conversion period in addition to the settling period of the reset level $V_{reset}$ and the settling period of the signal level $V_{sig}$.

Specifically, as illustrated in FIG. 5, row addresses of two read rows are latched in the settling period of the reset level $V_{reset}$ in synchronization with the latch set signal RLSET for two rows, and row addresses of two shutter rows are latched in synchronization with the latch set signal SLSET for two rows.

Further, for example, with regard to row addresses of shutter rows where the anti-blooming shutter operation is conducted in the next read period N+1, part of the operation is conducted in the settling period of signal level $V_{sig}$ in the current read period N, and the remaining part of the operation not complete in the settling period is conducted in the latter part of the AD conversion period.

In the solid-state imaging device according to the second example, the row selection operation of simultaneously selecting plural rows is also conducted in the latter part of the AD conversion period corresponding to the period where no effects occur on the image quality degradation in addition to the settling period of the reset level $V_{reset}$ and the settling period of the signal level $V_{sig}$.

In the reference signal having a slanted waveform illustrated by a solid line in FIG. 5, an upper side of the slanted waveform is a black level side, and a lower side thereof is a white level side. Therefore, in the AD conversion period corresponding to the read period of the signal level $V_{sig}$, the AD conversion is conducted on the black level side in the former part of the period, and the AD conversion is conducted on the white level side in the latter part thereof.

A description will be given below with respect to the reason why the latter part of the AD conversion period is the period where no effects occur on the image quality degradation. As described in the first example, the settling period of the reset level $V_{reset}$ and the settling period of the signal level $V_{sig}$ are the periods where no effects occur on the image quality degradation, because the signal sampling is not conducted in the periods.

A noise component that the read pixel itself physically has (so-called optical shot noise) is generated in the latter part of the read in the read period of the signal level $V_{sig}$. The optical shot noise is typically represented by a root of optical signals (number of electrons) accumulated in the photoelectric conversion element. Accordingly, as the optical signals (electron numbers) are increased, the optical shot noise is also enlarged. Since the signal level $V_{sig}$ is transited to a potential lower than the reset level $V_{reset}$ when the optical signals (electron numbers) are increased, the AD conversion accompanied by the comparison with the reference signal is also conducted in the latter part of the read period of the signal level $V_{sig}$, and the effects on the image quality by the optical shot noise are more dominant.

Since the above-mentioned fixed pattern noise due to the latch operation is generated by varying the potentials at the pixel selection lines 111, 112, and 113, the noise has a linearity. In contrast to this, since the optical shot noise varies for each of the pixels 20 in the pixel array unit 11, the noise is random across the entire image. Although this is a responsive content, it is considered that the noise having the linearity is not recognized by human eyes so long as the noise is 1/10 of the random noise.

Accordingly, the fixed pattern noise due to the latch operation has little influence on the image quality by conducting the latch operation in the latter part of the read period of the signal level $V_{sig}$. That is, a period corresponding to the latter part of the read period of the signal level $V_{sig}$ may be the period where no effects occur on the image quality degradation as compared with the preceding period.

3. Other Application Examples

According to the above-mentioned embodiments, the case has been exemplified in which the technology of the present disclosure is applied to a CMOS image sensor composed of pixels including photoelectric elements which are arranged in a matrix, but the technology of the present disclosure is not limited to the application to the CMOS image sensor. That is, the technology of the present disclosure can be applied to any X-Y address type solid-state imaging device in which pixels including photoelectric conversion elements are two-dimensionally arranged in a matrix.

The technology of the present disclosure can be applied not only to a solid-state imaging device that detects a distribution of incident light amount of visible light to be captured as an image but also to any solid-state imaging device that detects a distribution of incident amount of infrared radiation, X rays, particles, or the like to be captured as an image.

The solid-state imaging device may be formed as one chip or a module having an imaging function in which an imaging unit and a signal processing unit or an optical system are collectively packaged.

4. Electronic Device

A solid-state imaging device to which the technology of the present disclosure is applied can be used as an imaging unit (image capturing unit) in any electronic device such as an imaging device like a digital still camera, a video camera, or the like, a mobile terminal device such as a mobile phone device provided with an imaging function, or a copier using a solid-state imaging device for an image read unit. The above-described module mounted to an electronic device, that is, the camera module may function as the imaging device in some cases.

Imaging Device

Figure 6:
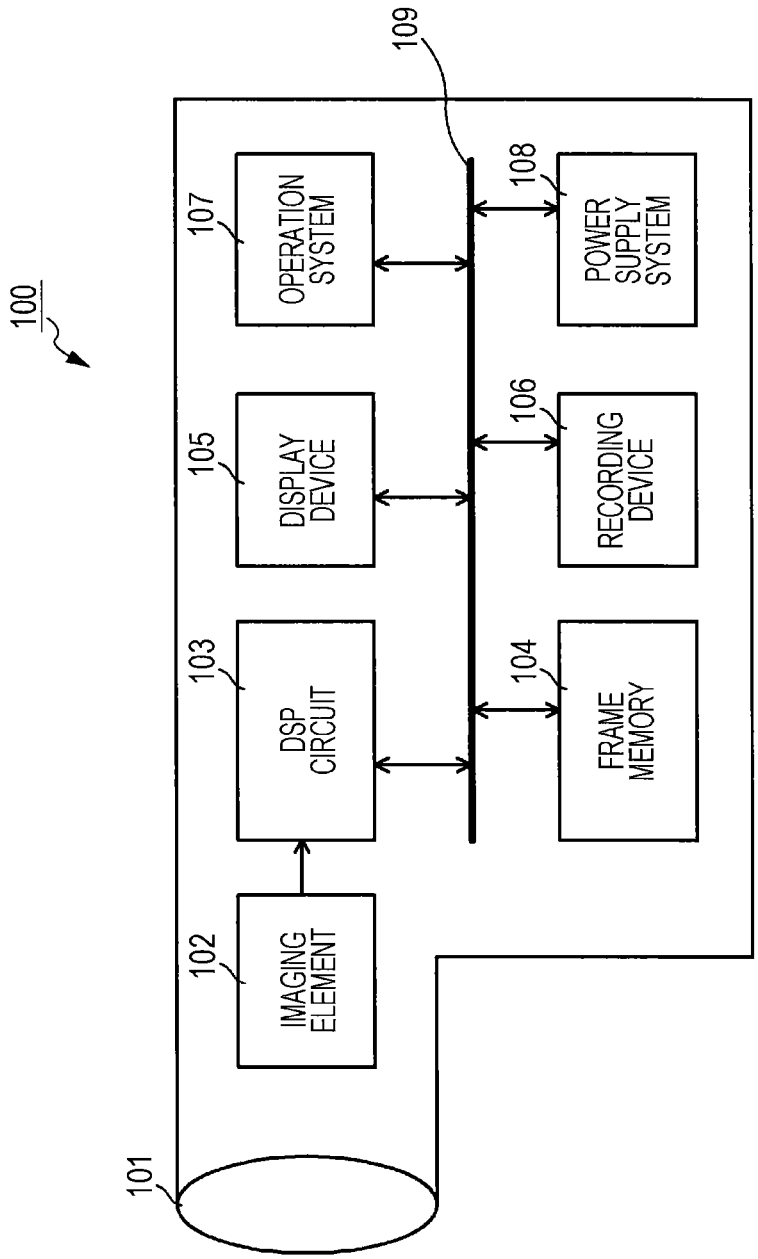
FIG. 6 is a block diagram of a configuration example of an imaging device corresponding to an example of an electronic device according to the embodiment of the present disclosure.

FIG. 6 is a block diagram illustrating a configuration example of an imaging device that is one example of the electronic device of the present disclosure.

As illustrated in FIG. 6, an imaging device 100 of the present disclosure includes an optical system including a lens group 101 and the like, an imaging element 102, a DSP circuit 103 functioning as a camera signal processing unit, a frame memory 104, a display device 105, a recording device 106, an operation system 107, a power supply system 108, and the like. The DSP circuit 103, the frame memory 104, the display device 105, the recording device 106, the operation system 107, and the power supply system 108 are mutually connected via a bus line 109.

The lens group 101 takes in incident light (image light) from a subject to be imaged on an imaging surface of the imaging element 102. The imaging element 102 converts the amount of incident light imaged on the imaging surface by the lens group 101 into an electric signal for each pixel to be output as a pixel signal.

The display device 105 is composed of a panel-type display device such as a liquid crystal display device or an organic electro luminescence (EL) display device and displays a moving image or a still image captured by the imaging element 102. The recording device 106 records the moving image or the still image captured by the imaging element 102 in a recording medium such as a memory card, a video tape, or a digital versatile disk (DVD).

The operation system 107 issues operation commands regarding various functions of the imaging device 100 under operations by a user. The power supply system 108 appropriately supplies supply targets with various power supplies serving as operation power supplies for the DSP circuit 103, the frame memory 104, the display device 105, the recording device 106, and the operation system 107.

The imaging device 100 is applied to a video camera, a digital still camera, and a camera module for a mobile device such as a mobile phone device. The solid-state imaging device according to the above-mentioned embodiment which can realize the read operation at a higher speed when signals of pixels in plural rows are simultaneously read out without an increase in the circuit scale can be used as the imaging element 102 in the imaging device 100. Accordingly, it is possible to largely contribute to the high frame rate of the imaging device 100.

5. Configuration of the Present Disclosure

The present disclosure can adopt the following configurations.

[1] A solid-state imaging device including:
a pixel array unit composed of pixels including photoelectric conversion elements which are arranged in a matrix; and
a pixel drive unit configured to perform a row selection operation of simultaneously selecting plural rows when a row is selected in accordance with an address signal for the respective pixels in the pixel array unit in a read period where signals are read out from the pixels.

[2] The solid-state imaging device according to [1], in which the pixel drive unit performs the row selection operation of simultaneously selecting the plural rows in a settling period of an analog circuit configured to process the signals read out from the pixels.

[3] The solid-state imaging device according to [1] or [2], in which the pixel drive unit performs in a current read period the row selection operation on read rows where a signal read of the pixels is conducted in the current read period and the row selection operation on reset rows where a reset of the pixels is conducted in a next read period.

[4] The solid-state imaging device according to [3], further including an AD converter configured to sequentially digitize analog reset levels and signal levels read out from the pixels,
in which the pixel drive unit performs the row selection operation on the reset rows where the reset of the pixels is conducted in the next read period, in the settling period of the analog circuit configured to process the signals read out from the pixels and an AD conversion period for the signal levels.

[5] The solid-state imaging device according to [4], in which the pixel drive unit performs the row selection operation on the reset rows where the reset of the pixels is conducted in the next read period, in a latter part of the AD conversion period for the signal levels.

[6] The solid-state imaging device according to [5], in which the AD converter performs the AD conversion on a white level side of the signal levels in the latter part of the AD conversion period for the signal levels.

[7] The solid-state imaging device according to any one of [1] to [6], further includes a control unit configured to control the pixel drive unit,
in which the control unit performs an operation of setting the address signal to the pixel drive unit plural times dividedly in the read period where the signals are read out from the pixels.

[8] A method for driving a solid-state imaging device including, when a drive of the solid-state imaging device is conducted in accordance with an address signal on respective pixels of a pixel array unit composed of the pixels including photoelectric conversion elements which are arranged in a matrix,
conducting a row selection operation of simultaneously selecting plural rows in a read period where signals are read out from the pixels.

[9] An electronic device including a solid-state imaging device including
a pixel array unit composed of pixels including photoelectric conversion elements which are arranged in a matrix, and
a pixel drive unit configured to perform a row selection operation of simultaneously selecting plural rows when a row is selected in accordance with an address signal for the respective pixels in the pixel array unit in a read period where signals are read out from the pixels.

The present disclosure contains subject matter related to that disclosed in Japanese Priority Patent Application JP 2012-132682 filed in the Japan Patent Office on Jun. 12, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel array unit composed of pixels including photoelectric conversion elements which are arranged in a matrix;
a pixel drive unit configured to perform a row selection operation of simultaneously selecting plural rows when a row is selected in accordance with an address signal for respective pixels in the pixel array unit in a read period where signals are read out from the pixels,
wherein the pixel drive unit performs, in a current read period, the row selection operation on reset rows where a reset of the pixels is conducted in a next read period, and
an analog-to-digital (AD) converter configured to sequentially digitize analog reset levels and signal levels read out from the pixels, wherein the pixel drive unit performs the row selection operation on the reset rows in a settling period of an analog circuit configured to process the signals read out from the pixels and an AD conversion period for the signal levels.

2. The solid-state imaging device according to claim 1, wherein the pixel drive unit performs the row selection operation of simultaneously selecting the plural rows in the settling period of the analog circuit configured to process the signals read out from the pixels.

3. The solid-state imaging device according to claim 1, wherein the pixel drive unit performs, in the current read period, the row selection operation on read rows where a signal read of the pixels is conducted in the current read period.

4. The solid-state imaging device according to claim 1, wherein the pixel drive unit performs the row selection operation on the reset rows where the reset of the pixels is conducted in the next read period, in a latter part of the AD conversion period for the signal levels.

5. The solid-state imaging device according to claim 4, wherein the AD converter performs the AD conversion on a white level side of the signal levels in the latter part of the AD conversion period for the signal levels.

6. The solid-state imaging device according to claim 1, further comprising:
a control unit configured to control the pixel drive unit,
wherein the control unit performs an operation of setting the address signal to the pixel drive unit plural times dividedly in the read period where the signals are read out from the pixels.

7. A method for driving a solid-state imaging device, the method comprising:
when a drive of the solid-state imaging device is conducted in accordance with an address signal on respective pixels of a pixel array unit composed of the pixels including photoelectric conversion elements which are arranged in a matrix, conducting a row selection operation of simultaneously selecting plural rows in a read period where signals are read out from the pixels,
wherein, in a current read period, the row selection operation is performed on reset rows where a reset of the pixels is conducted in a next read period, and
sequentially digitizing analog reset levels and signal levels read out from the pixels using an analog-to-digital (AD) converter, wherein the row selection operation is performed on the reset rows in a settling period of an analog circuit configured to process the signals read out from the pixels and an AD conversion period for the signal levels.

8. An electronic device comprising:
a solid-state imaging device including:
a pixel array unit composed of pixels including photoelectric conversion elements which are arranged in a matrix,
a pixel drive unit configured to perform a row selection operation of simultaneously selecting plural rows when a row is selected in accordance with an address signal for respective pixels in the pixel array unit in a read period where signals are read out from the pixels,
wherein the pixel drive unit performs, in a current read period, the row selection operation on reset rows where a reset of the pixels is conducted in a next read period, and
an analog-to-digital (AD) converter configured to sequentially digitize analog reset levels and signal levels read out from the pixels, wherein the pixel drive unit performs the row selection operation on the reset rows in a settling period of an analog circuit configured to process the signals read out from the pixels and an AD conversion period for the signal levels.

9. A solid-state imaging device comprising:
a pixel array unit composed of pixels including photoelectric conversion elements which are arranged in a matrix;
a pixel drive unit configured to perform a row selection operation of simultaneously selecting plural rows when a row is selected in accordance with an address signal for respective pixels in the pixel array unit in a read period where signals are read out from the pixels,
wherein the pixel drive unit performs, in a current read period, the row selection operation on read rows where a signal read of the pixels is conducted in the current read period and the row selection operation on reset rows where a reset of the pixels is conducted in a next read period; and
an analog-to-digital (AD) converter configured to sequentially digitize analog reset levels and signal levels read out from the pixels, wherein the pixel drive unit performs the row selection operation on the reset rows in a settling period of an analog circuit configured to process the signals read out from the pixels and an AD conversion period for the signal levels.

\* \* \* \* \*